US006789130B1

(12) United States Patent
Benayoun et al.

(10) Patent No.: US 6,789,130 B1
(45) Date of Patent: Sep. 7, 2004

(54) AUTOMATIC RATE ADAPTATION SYSTEM IN A LOCAL AREA NETWORK

(75) Inventors: Alain Benayoun, Cagnes-sur-Mer (FR); Jean-Francois Le Pennec, Nice (FR); Michel Verhaeghe, Vence (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,681

(22) Filed: May 16, 2000

(30) Foreign Application Priority Data

Aug. 26, 1999 (EP) ............................................. 99480083

(51) Int. Cl.[7] .......................... G06F 15/16; G01R 31/08
(52) U.S. Cl. ...................... 709/250; 370/230; 370/244; 370/402; 709/223; 709/233
(58) Field of Search ................................ 709/233, 250, 709/227, 228, 223; 370/235, 236, 466, 346, 257, 244, 230, 402; 714/748; 324/520

(56) References Cited

U.S. PATENT DOCUMENTS

| 5,553,083 | A | * | 9/1996 | Miller ........................ 714/748 |
| 5,574,722 | A | * | 11/1996 | Slykhouse et al. .......... 370/257 |
| 6,177,801 | B1 | * | 1/2001 | Chong ........................ 324/520 |
| 6,285,659 | B1 | * | 9/2001 | Feuerstraeter et al. ...... 370/244 |
| 6,301,241 | B1 | * | 10/2001 | Watanabe ................... 370/346 |
| 6,389,029 | B1 | * | 5/2002 | McAlear ..................... 370/402 |
| 6,389,476 | B1 | * | 5/2002 | Olnowich .................... 709/233 |
| 6,504,851 | B1 | * | 1/2003 | Abler et al. ................ 370/466 |
| 6,538,994 | B1 | * | 3/2003 | Horspool et al. ........... 370/230 |
| 6,587,875 | B1 | * | 7/2003 | Ogus ........................... 709/223 |

* cited by examiner

Primary Examiner—Jack B. Harvey
Assistant Examiner—Lambert L. Tran
(74) Attorney, Agent, or Firm—McGuireWoods LLP; John R. Pivnichny

(57) ABSTRACT

Automatic speed adaptation system in a Local Area Network (LAN) between a hub (10) including a hub adapter (20, 24, 28) and at least a workstation (12, 14, 16) including a workstation adapter (18, 22, 26) for exchanging data over a link connected between the hub adapter and the workstation adapter at a rate based on a frequency which is inversely proportional to the length of the link. Each adapter comprises a clock generator for generating a clock having a frequency between F1 and F2 and processing means for transmitting at least a check frame from the hub adapter to the workstation adapter at a rate based on a frequency VCLK generated by the clock generator under the control of the processing means and selected as being the frequency corresponding to the length of the link, and for transmitting an acknowledge frame from the workstation adapter to the hub adapter thereby ascertaining that the selected frequency is the right frequency resulting in the best quality of transmission.

20 Claims, 4 Drawing Sheets

AUTOMATIC RATE ADAPTATION SYSTEM IN A LOCAL AREA NETWORK

TECHNICAL FIELD

The invention relates generally to a Local Area Network (LAN) wherein each hub is connected to a plurality of workstations by means of links having various lengths and relates in particular to a system for automatically adapting the data rate exchanged between a hub and a workstation in a LAN.

BACKGROUND

In a Local Area Network (LAN) such as the ETHERNET network, each hub can be connected to a plurality of workstations by means of links having various lengths. But, the problem is that the transmission rate on a link can depend upon the length of the link. As a matter of fact, the minimal length of a frame in such a network depends on the go and return period on the link which corresponds to the time during which it is possible to detect a possible collision.

This requirement corresponds to the following inequation:

$$L/C \geq 2l/V$$

wherein:

V is the signal propagation speed on the link

C is the capacity of the network in bits/s

L is the minimal length of a frame in bits 1 is the length of the link.

This means that for a given rate at which the data are transmitted over the network corresponding to a given capacity C, there is a maximal length for the link connecting the hub to the workstation. Accordingly, if the system is configured in such a way that a new workstation would require to be connected at a length greater that the maximum allowed by the above inequation, the only way to solve the problem is to slow down the data rate. Thus, most of the fast hubs of an ETHERNET network have the capability to switch from 100 Mbits/s to 10 Mbits/s. However, assuming that a rate of 100 Mbits/s corresponds to a maximum length of 100 m, a rate of 50 Mbits/s should be allowed on a link of a 200 m length. Switching to a data rate of 10 Mbits/s means that the data are exchanged at a rate which is 5 times inferior to the rate which could be normally used and therefore makes the transmission more expensive for the customer.

SUMMARY OF THE INVENTION

Accordingly, the object of the invention is to provide a system and a method for automatically adapting the data rate over a link connecting a hub to a workstation in a Local Area Network (LAN) in function of the length of the link.

Therefore, the invention relates to a method for adapting the frequency of the transmission rate on a link connected between a hub including a hub adapter and at least a workstation including a workstation adapter, said rate being based on a frequency which is inversely proportional to the length of the link. This method comprises the steps of sending from the hub adapter to the workstation adapter a check frame at a rate based on a frequency value VCLK having a value comprised between a minimum frequency F1 and a maximum frequency F2, and sending from the workstation adapter to the hub adapter an acknowledge frame at a rate based on frequency F1 only if the workstation adapter has received the check frame within a predetermined interval of time.

According to a second aspect, the invention relates to an automatic speed adaptation system in a Local Area Network (LAN) between a hub including a hub adapter and at least a workstation including a workstation adapter for exchanging data over a link connected between the hub adapter and the workstation adapter at a rate based on a frequency which is inversely proportional to the lengths of the link. Each of said hub adapter and workstation adapter comprises a clock generator for generating a clock having a frequency between F1 and F2 and processing means for transmitting at least a check frame from the hub adapter to the workstation adapter at a rate based on a frequency VCLK generated by the clock generator under the control of the processing means and selected as being the frequency corresponding to the length of the link, and for transmitting an acknowledge frame from the workstation adapter to the hub adapter thereby ascertaining that the selected frequency is the right frequency resulting in the best quality of transmission.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
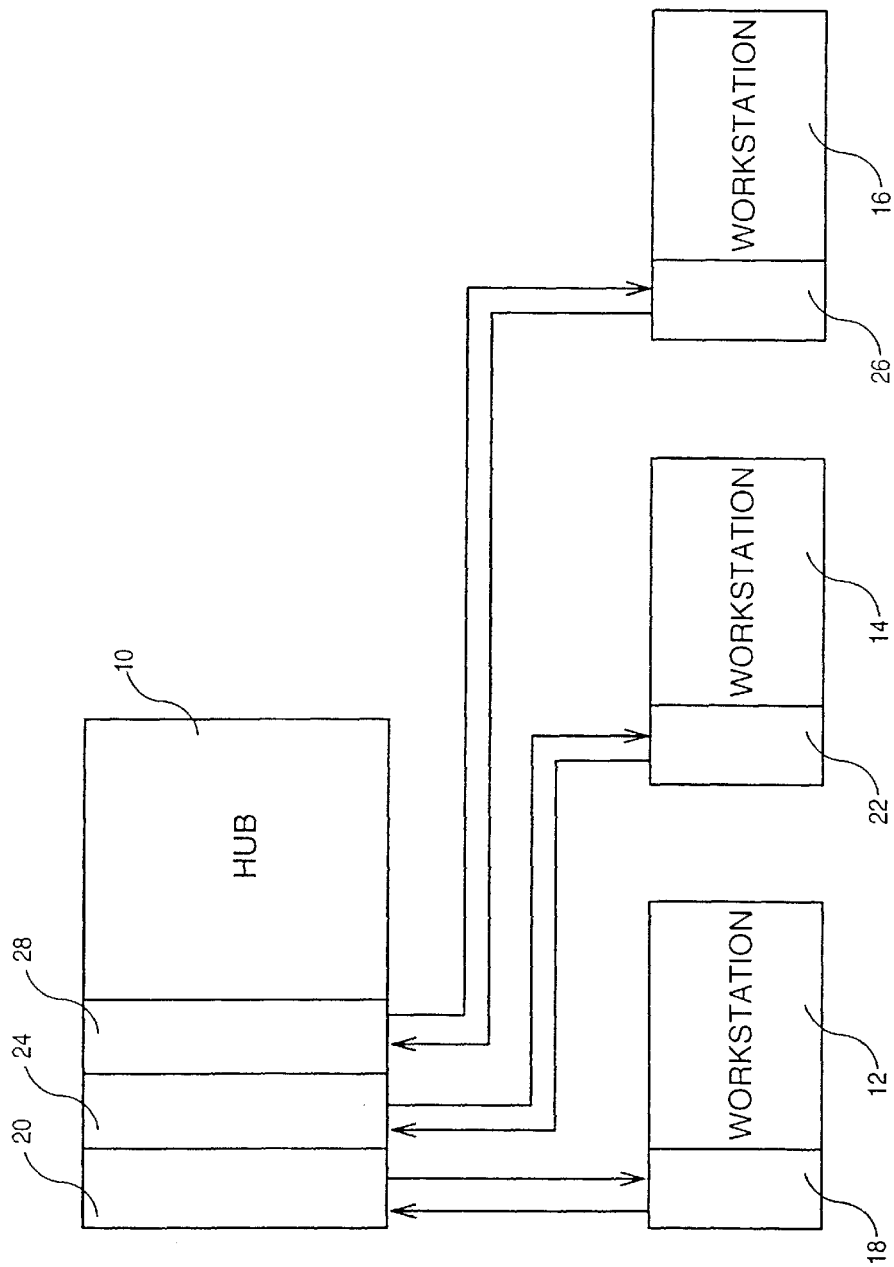
FIG. 1 represents a block-diagram of a system comprising a hub and three workstation connected to the hub by adapter incorporating the invention.

As illustrated in FIG. 1, the invention is implemented in a system wherein a hub 10 of a Local Area Network (LAN) such as ETHERNET is connected to a plurality of workstations 12, 14, 16. According to the invention, the connection between the hub and each workstation is by means of an adapter interfacing the hub and an adapter interfacing the workstation connected together by a two-line link. Thus, workstation 12 is connected to hub 10 by a workstation adapter 18 corresponding to a first hub adapter 20, workstation 14 is connected to hub 10 by a workstation adapter 22 corresponding to second hub adapter 24 and workstation 16 is connected to hub 10 by a workstation adapter 26 corresponding to a third hub adapter 28. It must be noted that the workstation adapter is identical to the hub adapter, the receiving part of the workstation adapter being connected to the transmitting part of the hub adapter and reciprocally, the transmitting part of the workstation adapter being connected to the receiving part of the hub adapter.

Figure 2:
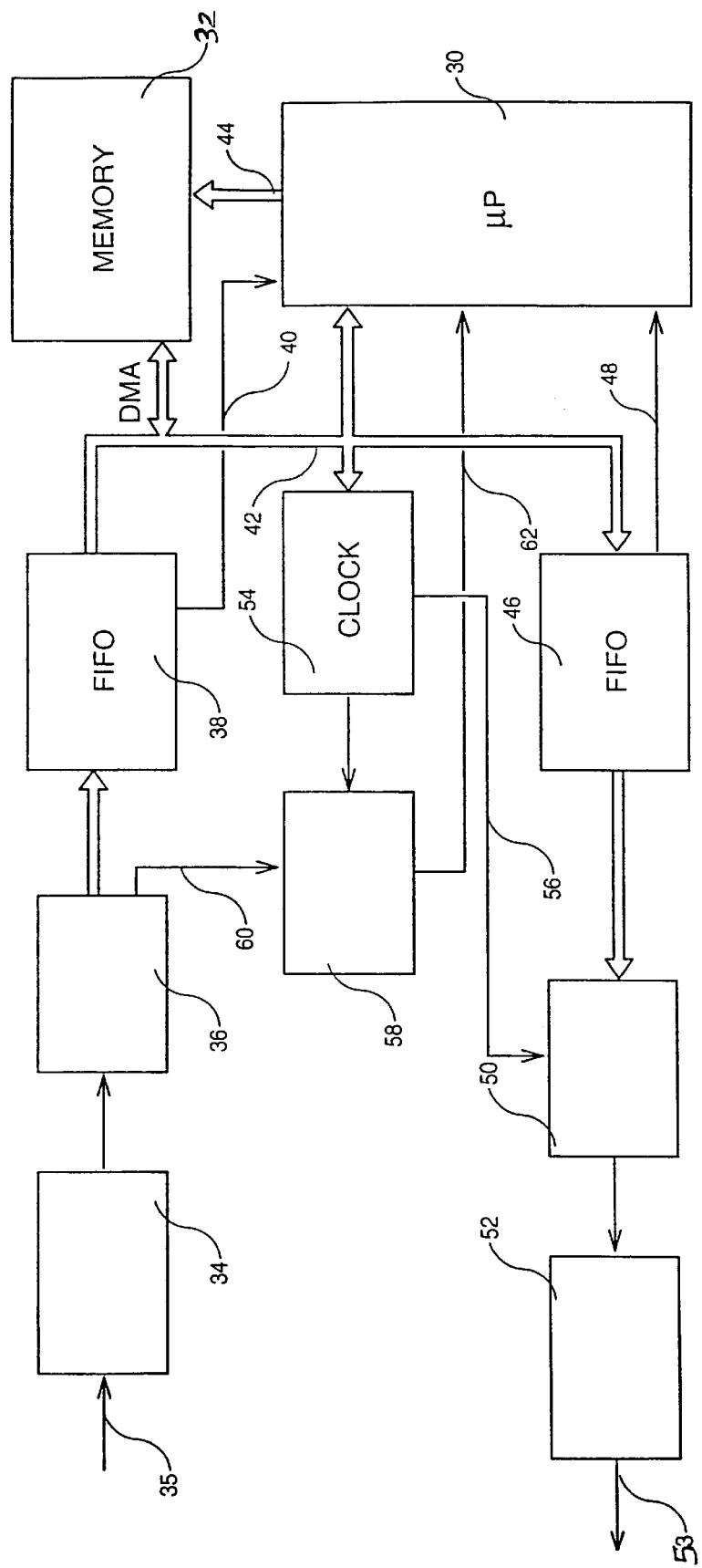
FIG. 2 represents a block-diagram of a workstation adapter used for connecting a hub to a workstation.

As described in FIG. 2, a workstation adapter such as the adapter 18 associated with workstation 12 comprises principally a microprocessor 30 and its memory 32. The receiving part includes a line receive adapter 34 receiving input line 35 and which contains filters and transformers for adapting the characteristics of the workstation adapter to input line 35. The serial data from line adapter 34 are supplied to a receive decoder 36 which contains generally an NRZI encoder, an NRZI to NRZ encoder, and a serial to parallel converter. The parallel data provided at the output of receive decoder 36 are transmitted to a receive FIFO 38 in which the parallel data are synchronously stored. When FIFO 38 is fill, a signal is sent to microprocessor 30 on full FIFO line 40. The internal DMA controller of microprocessor 30 can now transfer data on bus 42 from FIFO 38 to memory 32 at location defined by address bus 44. At the end of each transfer, microprocessor 30 is aware of the situation and can handle the data, for example changing the address of the frame and re-calculate the CRC header of the frame.

A frame which is stored in memory 32 can be transmitted to the hub under the control of microprocessor 30. The frame is first transferred over bus 42 from memory 32 to a transmit FIFO 46 via a DMA command. As long as transmit FIFO 46 is not full, which is determined by the activation of empty FIFO line 48, the frames can be transferred to transmit FIFO 46. At the output of transmit FIFO 46, the frames are transmitted to transmit encoder 50 which performs functions which are inverse of the functions of receive decoder 36, and in particular, the function of converting parallel data into serial data. These serial data are then transmitted to a line transmit adapter 52 for adapting the data to the characteristics of the transmit line 53.

An essential feature of the invention is a clock generator 54 which can be programmed by microprocessor 30 via bus 42 in order to generate a clock having a frequency comprised between F1 and F2 defining the data transmission rate. The clock generated by clock generator 54 is supplied to transmit encoder 50 on a clock line 56, the rate at which data are serially transmitted from transmit encoder 50 to transmit adapter 52 being determined by the clock frequency supplied by clock generator 54.

Another feature used by the invention is a state machine 5 8 which is clocked by clock generator 54, has an input line 60 from receive decoder 36 and an output line 62 connected to microprocessor 30. As described later, an interrupt is sent to microprocessor 30 on line 62 as soon as a correct check frame from the hub has been detected by state machine 58.

Figure 3:
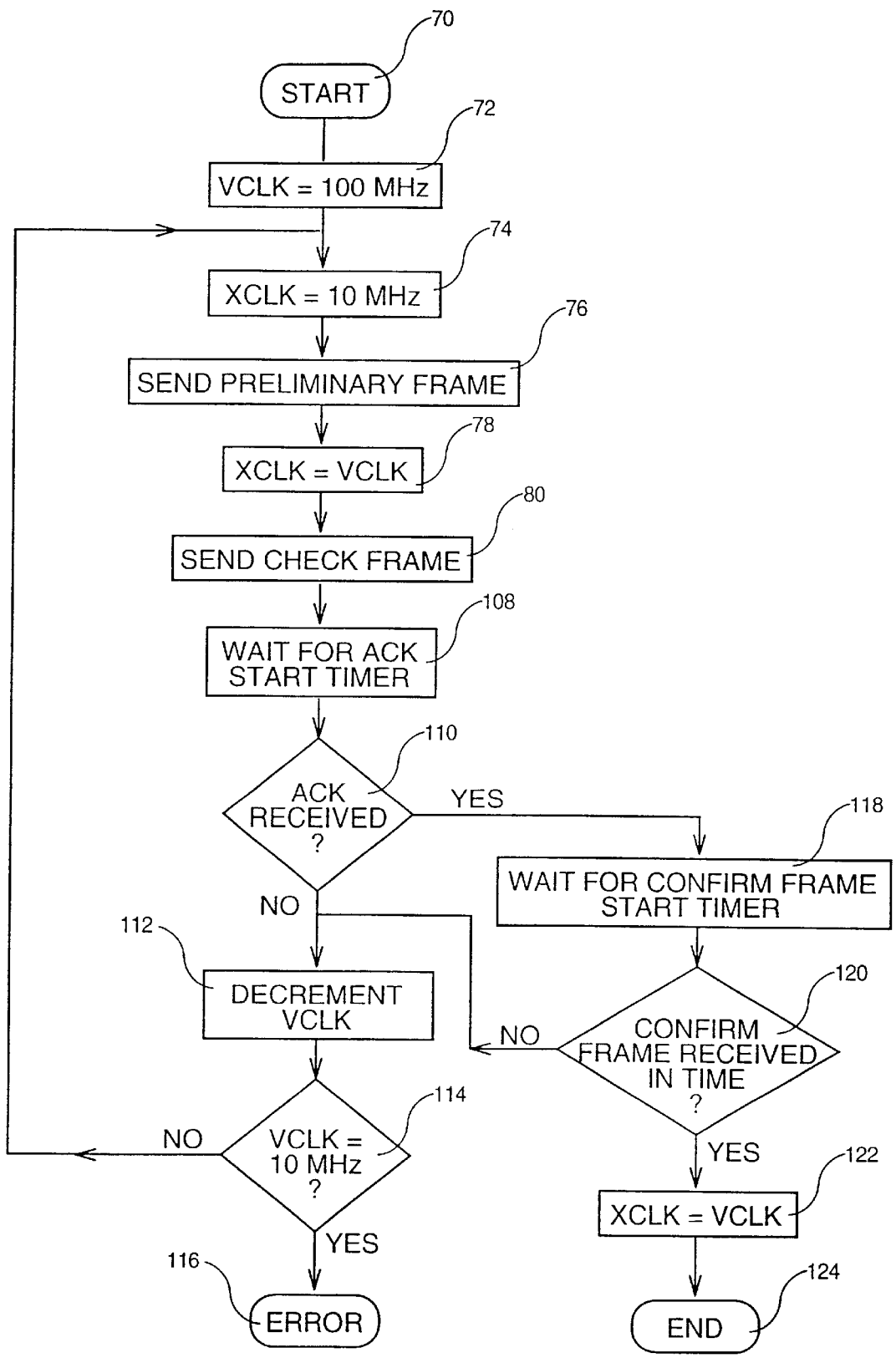
FIG. 3 is a flow-chart illustrating the steps of the method which are used in the hub adapter according to the invention.
Figure 4:
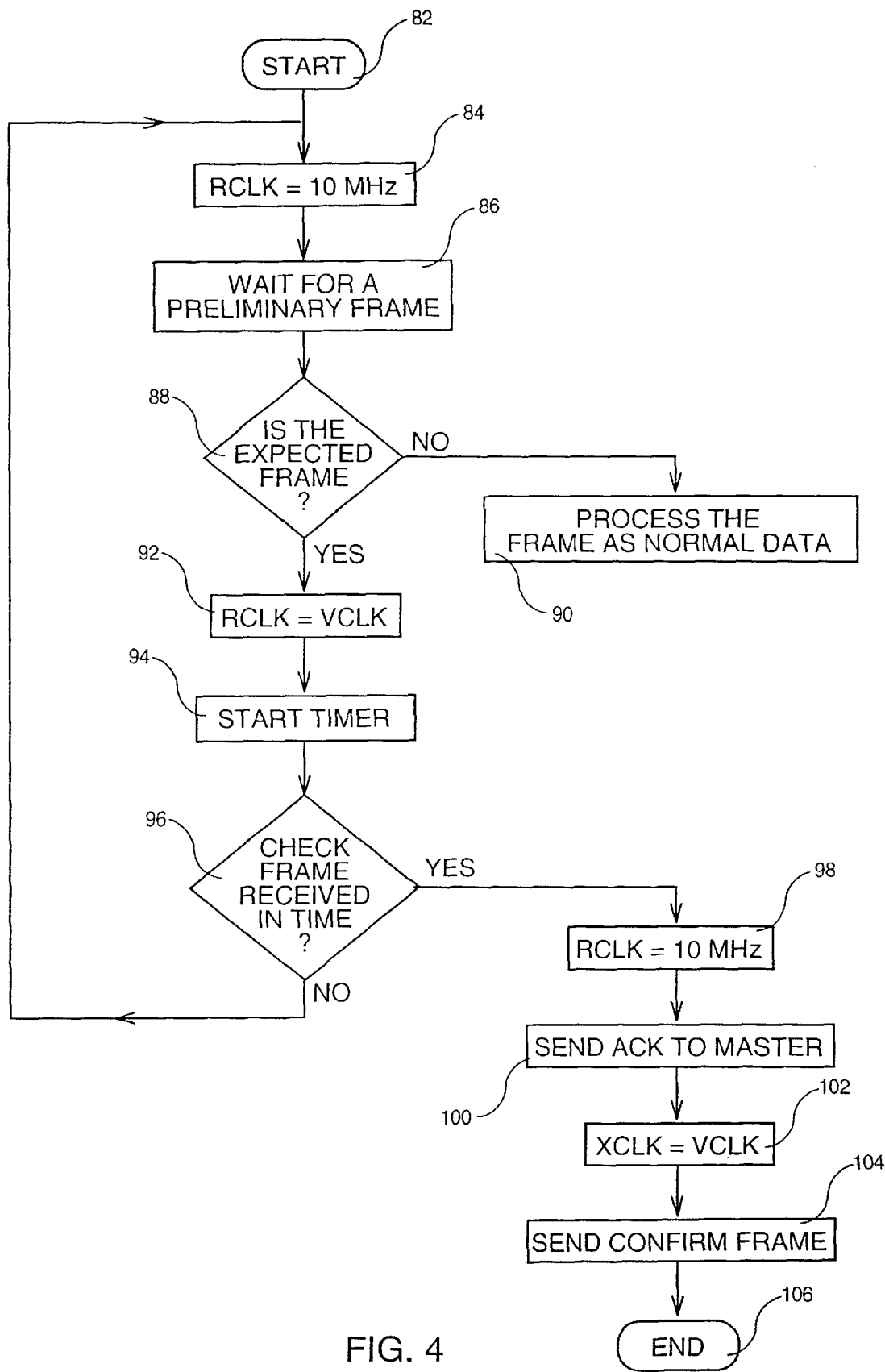
FIG. 4 is a flow-chart illustration the steps of the method which are used in the workstation adapter according to the invention.

The method for adapting the speed of the data according the invention is now described in reference to FIGS. 3 and 4 representing respectively the flow charts of the steps which are implemented by the hub adapter acting as the master unit on the one hand and by the workstation adapter acting as a slave unit on the other hand.

Referring to FIG. 3, after starting (step 70) the adaptation process, a variable VCLK representing the frequency of the clock to be determined in the process is set to 100 MHz (step 72).

Then, the microprocessor of the master (hub adapter) commands the clock generator to set the clock XCLK to 10 MHz (step 74) in order to send a preliminary frame (step 76) which will be received by the slave (workstation adapter) since its data are sent at a rate of 10 MHz which is the minimum frequency F1 to be used. Such a preliminary frame is a frame containing the value of VCLK to be used. At the beginning of the process, VCLK is set to 100 MHz as being the maximum frequency F2.

After having forwarded the preliminary frame, the frequency XCLK of the master clock is set to VCLK (step 78), and a check frame is sent from master to slave by using VCLK as clock frequency (step 80). It must be noted that such a check Frame is a 1.5 Kbytes length frame having its data field filled with a bytes AA or 55 in hexadecimal in order to have a maximum of transitions able to be detected on the receiving side.

At the same time, the process has started (step 82) in the slave. The frequency RCLK of the slave clock is first set to 100 MHz (step 84) and the slave is waiting for the preliminary frame forwarded by the master (step 86).

Returning to FIG. 2, the function of state machine 58 is to detect any pattern which is decoded by receive decoder 36. In the case of the preliminary frame, this one is detected as being the correct frame by state machine 58 which interrupts microprocessor 30 on line 62. It is possible that the frame which is decoded does not correspond to the expected frame (step 88). In such case, the frame is processed by microprocessor 30 as a normal data frame (step 90). If the decoded frame is the preliminary frame, the frequency RCLK of the slave clock is set to the frequency VCLK contained in the preliminary frame (step 92).

At this time, the slave is aware that a check frame has been forwarded by using VCLK as clock frequency. Therefore, a timer is started (step 94). Such a timer is used to check whether the check frame is received in due time (step 96). If the check frame is not received within the defined time or is never received, this means that the length of the link between the hub and the workstation does not authorize the use of frequency as high as VCLK (100 MHz at the beginning of the process). The slave knows that the process has to be started again with a clock frequency less than VCLK. Therefore, the process is looped to step 84 where the slave clock is set to 10 MHz.

If the check frame is received by the slave in due time (that is detected by the state machine 58 of the workstation adapter), the frequency RCLK of the slave clock is set to 10 MHz (step 98) and an acknowledge frame ACK is sent to the master (step 100). Such an acknowledge frame is a small frame of about 20 data bytes which are of the type CO in hexadecimal.

After that, the frequency of the slave clock is set again to the frequency VCLK which was contained in the preliminary frame (step 102) and a confirm frame is forwarded to the master (step 104). Such a confirm frame is, in fact, a frame which is identical to the check frame and is used to determine whether the length of the link between the hub and the workstation authorizes the transmission from the workstation to the hub at frequency VCLK. It must be noted that sending a confirm frame identical to the check frame is not absolutely necessary inasmuch as it has been already checked that the transmission from the hub to the workstation can be achieved by using VCLK as clock frequency and that it would be surprising that the transmission in the other direction cannot be achieved with the same frequency. After having sent the confirm frame, the adaptation process is ended (step 106) and the slave waits for normal data frames.

Returning to FIG. 3, after having forwarded the check frame, the master waits for the acknowledge frame (ACK) sent by the slave and starts a timer (step 108). Such a timer is used to determine whether ACK is received in due time (step 110). Assuming that ACK is not received within the time defined by the timer, this means that the length of the link does not authorize to send data at a frequency as high as VCLK. Therefore, VCLK is decremented by a predetermined frequency step which can be for instance 5 MHz (step 112). After this decrementation, a checking is made to determine whether the new value of VCLK has reached the minimum frequency F1, 10 MHz in the present case (step 114). If so, this means that there is an error to be processed (step 116). If not, the process is looped again to step 74 where the transmit clock XCLK is set to 10 MHz in order to send a new preliminary frame and verify whether the new value VCLK can be used.

Assuming that ACK is received, the master waits for receiving a confirm frame and a timer is started (step 118). Such a timer is used to determine whether the confirm frame sent by the slave is received in due time, that is detected by the state machine of the hub adapter, (step 120). If so, the frequency XCLK of the master clock is set to VCLK (step 122) and the process is ended (step 124). If not, this means that the length of the link does not authorize the transmission of data at a Frequency of VCLK in the direction from the slave to the master and the process is looped back to step 112 for decrementing VCLK.

Whereas the invention has been described by using a current frequency VCLK comprised between a minimum frequency F1 of 10 MHz and a maximum frequency F2 of 100 MHz, it is clear that any other values could have been used. Thus, it is possible to use F1=100 MHz and F2=1000 MHz. In such a case, the predetermined decrement of VCLK could be 50 MHz instead of 5 MHz.

What is claimed is:

1. Method for adapting the frequency of the transmission rate on a link connected between a hub including a hub adapter and at least a workstation including a workstation adapter, said rate being based on a frequency which is inversely proportional to the length of said link; said method comprising the steps:

sending from said hub adapter to said workstation adapter a check frame at a rate based on a frequency value VCLK having a value comprised between a minimum frequency F1 and a maximum frequency F2; and, sending from said workstation adapter to said hub adapter an acknowledge frame at a rate based on said frequency F1 only if said workstation adapter has received said check frame within a predetermined interval of time.

2. Method according to claim 1, further comprising the initial step of sending from said hub adapter to said workstation adapter a preliminary frame at a rate based upon said minimum frequency F1, said preliminary frame containing said frequency value VCLK to be used for transmitting said check frame.

3. Method according to claim 2, wherein said frequency value VCLK is decremented by a predetermined value by said hub adapter when this one has not received said acknowledge frame from said workstation adapter within a predetermined interval of time.

4. Method according to claim 3, wherein the steps are repeated until said acknowledge frame is received by said hub adapter within a predetermined interval of time, the frequency value VCLk which is obtained after the last decrementation being the correct frequency to be used with said link.

5. Method according to claim 4, wherein the value of said frequency value VCLK to be used at the initialization of the method is said maximum frequency F2.

6. Method according to claim 5 wherein a confirm frame is sent from said workstation adapter to said hub adapter after it has received said check frame, said confirm frame being transmitted at a rate based on said frequency value VCLK in order to check that this frequency can be used in both directions between said hub adapter and said workstation adapter.

7. Method according to claim 6, wherein said frequency value VCLK is decremented by predetermined value by said hub adapter when this one has not received said confirm frame from said workstation adapter within a predetermined interval of time.

8. Method according to claim 7, wherein said predetermined value is 5 MHz.

9. Method according to claim 8, wherein F1=10 MHz and F2=100 MHz.

10. Method according to claim 1, wherein a sending error has occurred if said check frame is not received within said predetermined interval of time, and no said acknowledgment frame is sent if said sending error has occurred.

11. Method according to claim 10, wherein said frequency value VCLK is decremented by a prescribed amount if no said acknowledgement frame is received by said hub adapter.

12. Automatic speed adaptation system in a Local Area Network (LAN) between a hub including a hub adapter and at least a workstation including a workstation adapter for exchanging data over a link connected between said hub adapter and said workstation adapter at a rate based on a frequency which is inversely proportional to the length of said link; said system being characterized in that each of said hub adapter and workstation adapter comprises a clock generator for generating a clock having a frequency between F1 and F2 a processor which transmits at least a check frame from said hub adapter to said workstation adapter at a rate based on a frequency VCLK generated by said clock generator under the control of said processor and selected as being the frequency corresponding to the length of said link, and transmits an acknowledge frame from said workstation adapter to said hub adapter thereby ascertaining that said selected frequency is the right frequency resulting in the best quality of transmission.

13. Automatic speed adaptation system according to claim 12, wherein the processor of said hub adapter sends to said workstation adapter previously to sending said check frame, a preliminary frame at a rate based upon said minimum frequency F1, said preliminary frame containing said frequency value VCLK to be used for transmitting said check frame.

14. Automatic speed adaptation system according to claim 13, wherein said frequency value VCLK is decremented by predetermined value by said hub adapter when this one has not received said acknowledge frame from said workstation adapter within a predetermined interval of time.

15. Automatic speed adaptation system according to claim 14 wherein the value of said frequency value VCLK to be used at the initialization of the method is said maximum frequency F2.

16. Automatic speed adaptation system according to claim 15, wherein the processor of said workstation adapter sends to said hub adapter and after said workstation adapter has received said check frame, a confirm frame which is transmitted at a rate based on said frequency value VCLK in order to check that this frequency can be used in both directions between said hub adapter and said workstation adapter.

17. Automatic speed adaptation system according to claim 16, wherein said frequency value VCLK is decremented by predetermined value by said hub adapter when this one has not received said confirm frame from said workstation adapter within a predetermined interval of time.

18. Automatic speed adaptation system according to claim 17, wherein each of said hub adapter and workstation adapter comprises a state machine clocked by said clock generator and which is used to detect any pattern received by the adapter such as said preliminary frame, said check frame or said confirm frame and to send an interrupt signal to said processor upon detection.

19. Automatic speed adaptation system according to claim 12, wherein said workstation adaptor is configured to determine a sending error has occurred if said check frame is not received within a predetermined interval of time.

20. Automatic speed adaptation system according to claim 19, wherein said workstation adaptor is configured to not send said acknowledgment frame if said sending error has occurred.

* * * * *